No. 770,080. PATENTED SEPT. 13, 1904.
E. LAPISSE.
DEVICE FOR PROTECTING PNEUMATIC TIRES.
APPLICATION FILED DEC. 23, 1903.
NO MODEL.
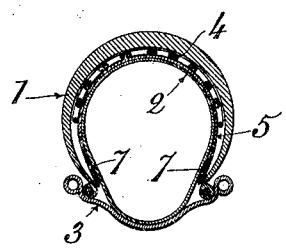
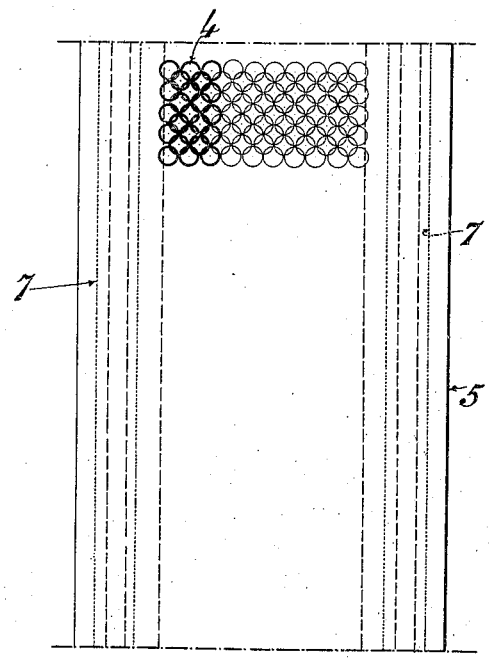
WITNESSES:
W. M. Avery
INVENTOR
Emile Lapisse
BY
ATTORNEYS.

No. 770,080. Patented September 13, 1904.

UNITED STATES PATENT OFFICE.

EMILE LAPISSE, OF ELBEUF, FRANCE.

DEVICE FOR PROTECTING PNEUMATIC TIRES.

SPECIFICATION forming part of Letters Patent No. 770,080, dated September 13, 1904.

Application filed December 23, 1903. Serial No. 186,316. (No model.)

*To all whom it may concern:*

Be it known that I, EMILE LAPISSE, merchant, a citizen of the Republic of France, residing at 9 Rue de la Barriere, Elbeuf, Seine-Inférieure, in the Republic of France, have invented certain new and useful Improvements in Devices to Protect Pneumatic Tires, of which the following is a specification.

This invention relates to improvements in devices to protect pneumatic tires; and the object of the invention is to render the said tires impenetrable, in the first place because foreign bodies are prevented from penetrating into the same and in the second place because the swellings, which usually occur in the air-chamber when some parts of the same become worn, are contained.

The protecting device is independent of the outer covering and can be located within any outer covering of usual construction. It comprises a flexible wire-gauze fixed onto a strip of canvas or other suitable flexible matter—such as fabric, leather, or the like—which serves to protect the air-chamber from contact with the metal.

One important feature of the invention consists in using as wire-gauze a sort of wide chain made up of rings engaged one in another in the same manner as in a coat of mail. As this chain is not incorporated with the rubber, but is free between the outer covering and the canvas which carries it, the said chain has much greater flexibility than any other wire-gauze either woven or plaited. It is consequently much more lasting and does not wear out either the outer covering or any other part of the tire, because the meshes always remain round and even.

The invention also consists in providing the two free edges of the strip of canvas with fastenings by means of which any person is able to fit the protecting device either against the inner face of the usual outer covering or around the tire before inserting the air-chamber between the said tire and the protecting device. By this means any pneumatic tire now in use can easily be rendered impenetrable.

The invention also consists in using as a fastener of the protecting device elastic strips fixed to each edge of the strip of canvas or other flexible matter or of the strip of wire-gauze. To fix each of the elastic strips, it is held stretched while being stitched to the edge of the protecting device. On account of the contracting force of the elastic strips the protecting device is automatically held around the air-chamber and the tire. For that purpose the ends of the protecting-strip have only to be stitched together, so as to form a closed ring, the elastic strips being when free not quite so long as the circumference of the tire, while the strip of wire-gauze must be of the same length as the circumference of the air-chamber when the latter is inflated. For the purpose of holding the protecting-strip around the tire or within the outer covering the edges of the said strip may also be provided with rods similar to those used with the usual coverings.

The accompanying drawings show one form in which the present invention may be carried out.

Figure 1 is a cross-section of a pneumatic tire provided with a protecting-strip the edges of which are provided with elastic strips; and Fig. 2 is an elevation, on a larger scale, of the protecting-strip, only some of the meshes of this wire-gauze being shown as an example.

1 represents the usual outer covering of a pneumatic tire for cycles, and 2 an air-chamber inclosed between the said outer covering and the felly 3.

The protecting device comprises a strip of canvas 5, on one side of which is fixed by stitching, hooking, or the like a strip of wire-gauze 4, while the elastic strips 7 are fixed on the opposite side along the edges of the same in both cases. The strips 7 are when free not quite so long as the strip 5. They are suitably stretched when being fixed to the latter, so that when fixed they will give to the protecting device a tendency to contract on itself.

When mounting the pneumatic tire, there is first located in the felly 3 one of the edges of the covering 1, which may be provided with rods or with heels. Then one edge of the protecting device is inserted under the covering and around the tire. The said protecting device is held by the tension of the strip 7 contracted around the tire. The air-chamber is put in place by inserting it between the strip 5 and the tire, after which the free edge of the protecting device first and then the free edge of the covering are engaged around the said tire. When the air-chamber is inflated, the protecting device becomes stretched and applied against the covering, as shown in Fig. 1.

The strips 7 may be made of rubber or of elastic fabric and either fixed under the canvas 5 by stitching or the like, as shown in the drawings, or incorporated with the said canvas during the manufacture of the latter or otherwise. The strip 5 itself may be made of canvas or any other fabric or flexible material, such as leather and the like. As to the wire-gauze 5, it is preferably composed of meshes of any suitable shape and which, if desired, are galvanized or tinned to protect the same against oxidation.

In case the protecting device is provided with rods fixed or inclosed in its edges the mounting may be effected either as hereinbefore described or in beginning by locating the protecting device in the covering by means of its rods and then engaging successively around the pneumatic tire one edge of the covering, the air-chamber, and the other edge of the covering.

The rods of the protecting device may of course be made of any suitable material and of any suitable shape in cross-section.

The protecting device 4 5 may be used in the form of a continuous strip from which the proper length is cut for each tire, the edges of the said strip being covered with rubber paste or provided with any other suitable fastening means, such as hooks and eyes, elastic strips, or the like.

In certain cases the wire-gauze may be located directly under the rubber covering, thus saving a thickness of canvas. The elastic strips or the rods of the protecting device will then be arranged directly under the edges of the wire-gauze.

I claim—

1. A protecting device for pneumatic tires, comprising a strip of wire-gauze, a strip of canvas or other similar fabric onto which the wire-gauze is fixed, and elastic strips fixed on the edges of the strip of canvas, the length of the said elastic strips, when free, being a little less than the length of the canvas strip.

2. A protector for pneumatic tires, comprising a central strip of wire-gauze, a strip of canvas or other fabric onto which the wire-gauze is fixed, and lateral elastic strips incorporated in a stretched state or under tension with the edges of the said strip of canvas or other fabric.

3. A protector for pneumatic tires, comprising a strip of wire-gauze, a strip of canvas upon which the wire-gauze is secured, and an elastic strip secured to each edge of the canvas strip.

In testimony that I claim the foregoing as my invention I have signed my name in presence of two subscribing witnesses.

EMILE LAPISSE.

Witnesses:
 HANSON C. COXE,
 MAURICE ROUX.